US010216644B2

United States Patent
Igahara et al.

(10) Patent No.: US 10,216,644 B2
(45) Date of Patent: Feb. 26, 2019

(54) MEMORY SYSTEM AND METHOD

(71) Applicant: Toshiba Memory Corporation, Minato-ku, Tokyo (JP)

(72) Inventors: Shunichi Igahara, Yokohama Kanagawa (JP); Toshikatsu Hida, Yokohama Kanagawa (JP); Mitsunori Tadokoro, Fujisawa Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 42 days.

(21) Appl. No.: 15/447,916

(22) Filed: Mar. 2, 2017

(65) Prior Publication Data
US 2018/0129415 A1 May 10, 2018

Related U.S. Application Data

(60) Provisional application No. 62/417,451, filed on Nov. 4, 2016.

(51) Int. Cl.
G06F 12/00 (2006.01)
G06F 12/1009 (2016.01)
G06F 12/02 (2006.01)

(52) U.S. Cl.
CPC ...... *G06F 12/1009* (2013.01); *G06F 12/0246* (2013.01); *G06F 2212/656* (2013.01); *G06F 2212/7201* (2013.01); *G06F 2212/7203* (2013.01)

(58) Field of Classification Search
None
See application file for complete search history.

(56) References Cited

U.S. PATENT DOCUMENTS

| | | | | |
|---|---|---|---|---|
| 7,366,869 | B2* | 4/2008 | Sartorius | G06F 12/1027 711/205 |
| 9,047,177 | B2 | 6/2015 | Matsudaira et al. | |
| 2005/0044335 | A1* | 2/2005 | Bee | G06F 12/1466 711/170 |
| 2012/0089811 | A1* | 4/2012 | Sawai | G06F 12/1027 711/207 |
| 2013/0339576 | A1 | 12/2013 | Liu et al. | |
| 2015/0356024 | A1* | 12/2015 | Loh | G06F 12/1054 711/113 |

FOREIGN PATENT DOCUMENTS

JP 2005-301885 A 10/2005

* cited by examiner

*Primary Examiner* — John A Lane
(74) *Attorney, Agent, or Firm* — White & Case LLP

(57) ABSTRACT

According to one embodiment, a memory system includes a nonvolatile first memory, a second memory which has a buffer, and a memory controller. The memory controller manages a plurality of pieces of translation information. In a case where the plurality of pieces of translation information include a first plurality of pieces of translation information, the memory controller caches first translation information among the first plurality of pieces of translation information and does not cache second translation information among the first plurality of pieces of translation information. The first plurality of pieces of translation information linearly correlates a plurality of continuous physical addresses with a plurality of continuous logical addresses.

12 Claims, 12 Drawing Sheets

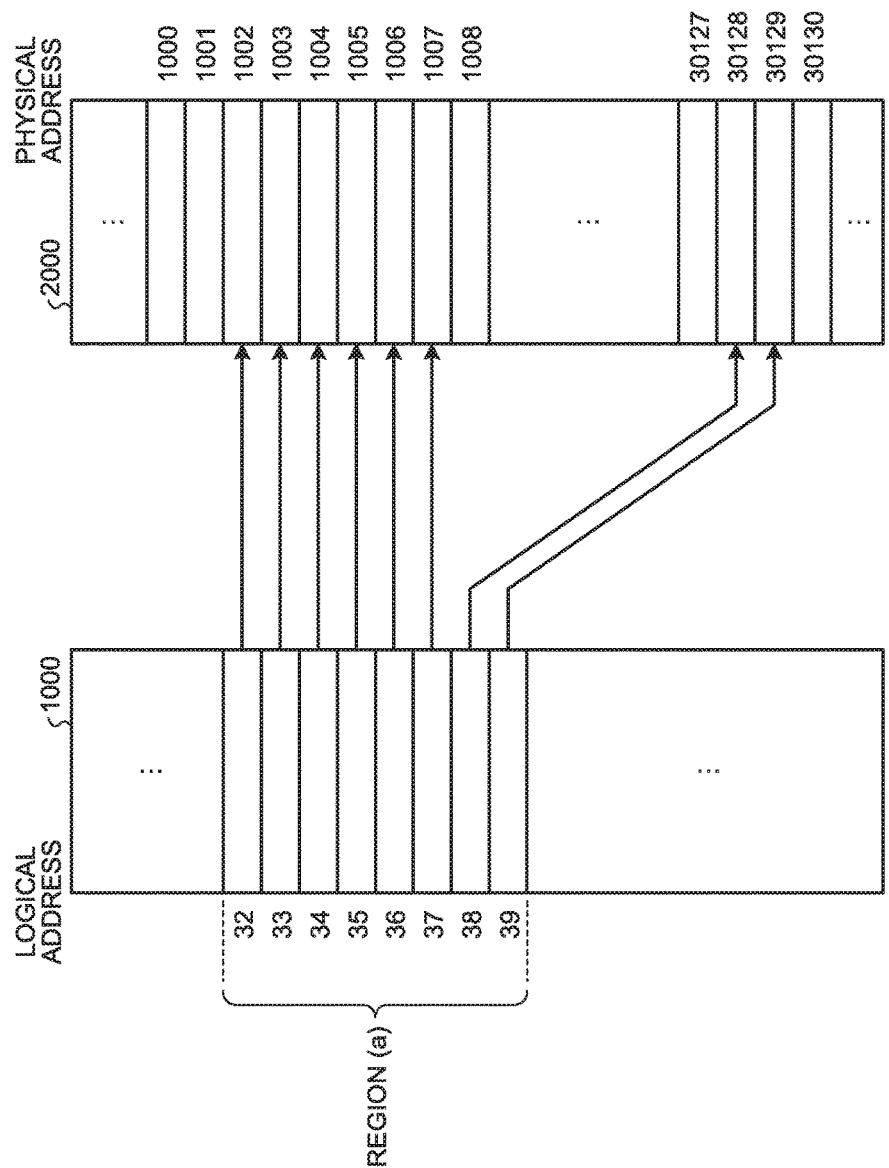

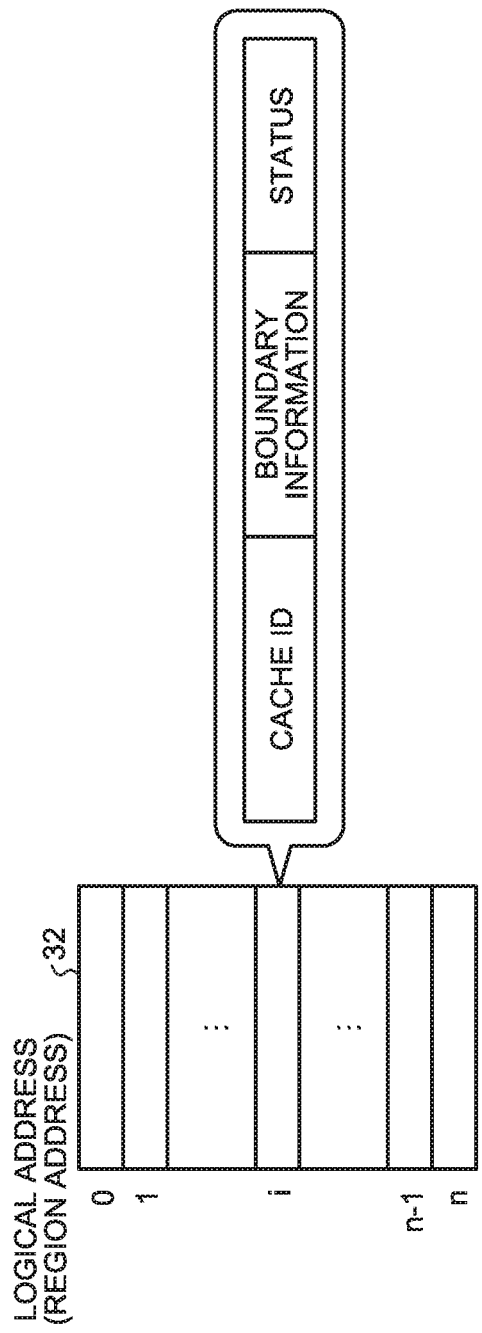

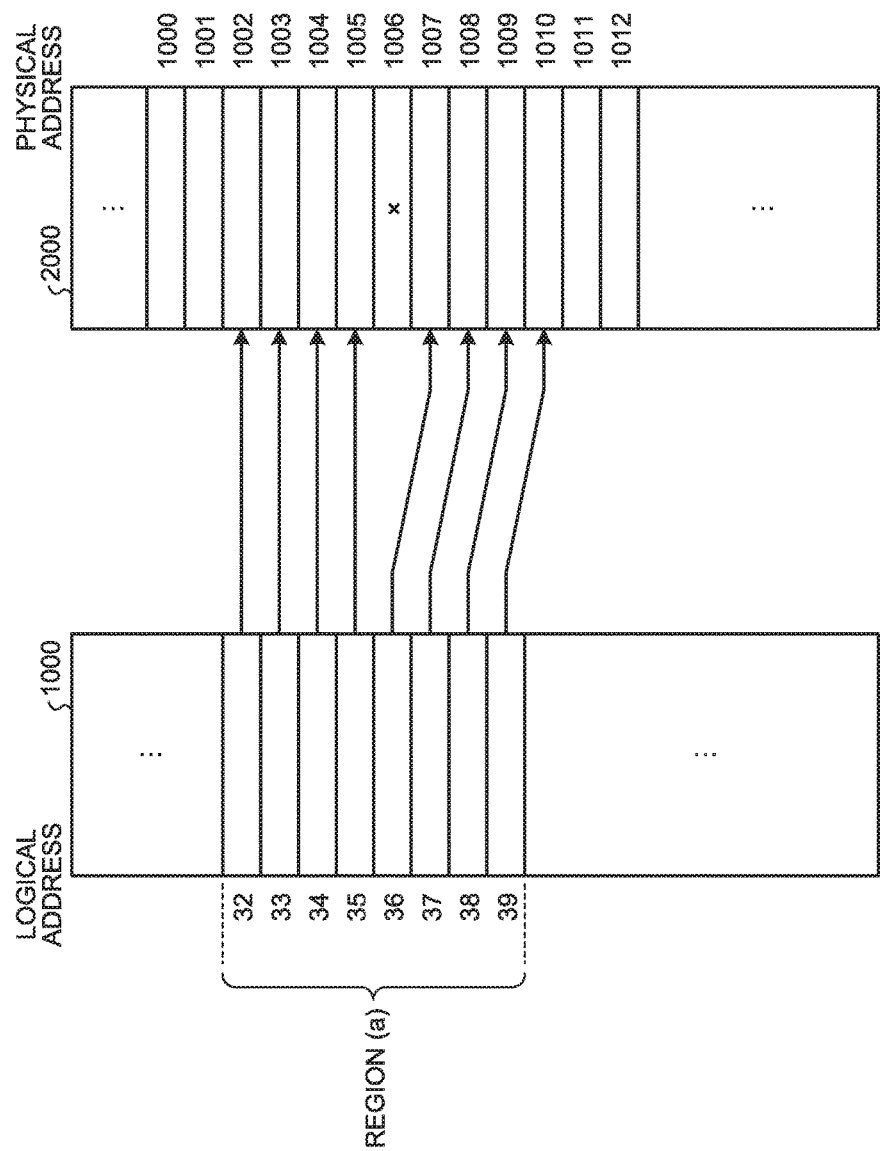

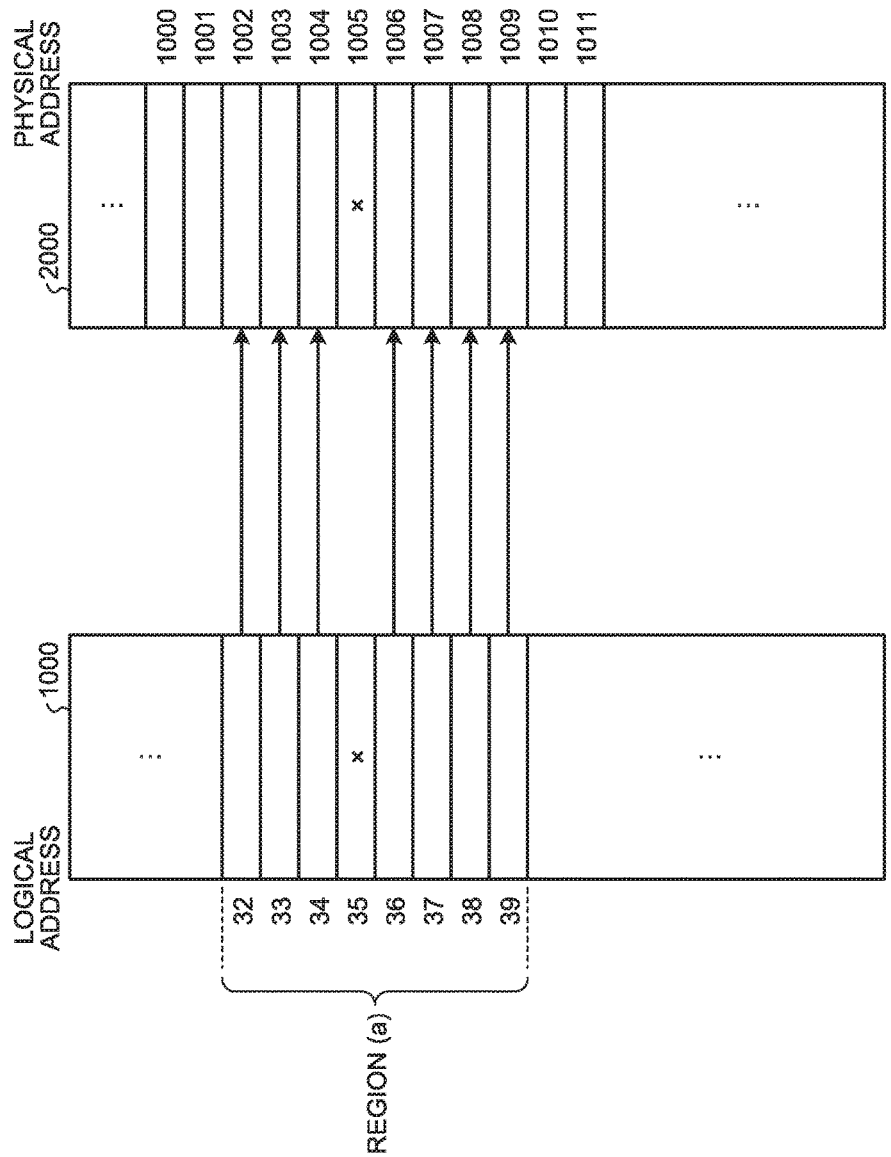

MEMORY SYSTEM AND METHOD

CROSS-REFERENCE TO RELATED APPLICATIONS

This application is based upon and claims the benefit of priority from U.S. Provisional Application No. 62/417,451, filed on Nov. 4, 2016; the entire contents of which are incorporated herein by reference.

FIELD

Embodiments described herein relate generally to a memory system and a method.

BACKGROUND

Conventionally, a memory system including a nonvolatile memory such as a flash memory as a storage memory is known. The memory system stores one or more pieces of translation information therein. Each piece of translation information indicates a correspondence between a logical address and a physical address. That is, each piece of translation information maps a location in the nonvolatile memory on a logical address. The memory system updates corresponding translation information in response to writing data of which a location is designated by a logical address to the nonvolatile memory.

The memory system includes a volatile memory in addition to a storage memory. The memory system caches translation information in the volatile memory during operation and uses the translation information cached in the volatile memory. A technique of efficiently caching translation information in the volatile memory is required for the memory system.

BRIEF DESCRIPTION OF THE DRAWINGS

FIG. 11 is a diagram illustrating an example of mapping according to a second embodiment;

FIG. 12 is a diagram illustrating an example of a data structure of buffer management information according to the second embodiment;

FIG. 13 is a diagram illustrating an example of mapping according to a fifth embodiment; and FIG. 14 is a diagram illustrating another example of mapping according to the fifth embodiment.

DETAILED DESCRIPTION

In general, a memory system includes a first memory, a second memory, and a memory controller. The first memory is nonvolatile. The second memory includes a buffer. The memory controller manages a plurality of pieces of translation information. Each piece of translation information correlates a physical address indicating a location in the first memory with a logical address. In a case where the plurality of pieces of translation information include a first plurality of pieces of translation information, the memory controller caches first translation information and does not cache second translation information. The first plurality of pieces of translation information linearly correlates a plurality of continuous physical addresses with a plurality of continuous logical addresses. The first translation information correlates a first physical address with a first logical address among the first plurality of pieces of translation information in the buffer. The second translation information correlates a second physical address with a second logical address among the first plurality of pieces of translation information in the buffer.

Hereinafter, a memory system and a method according to embodiments will be described in detail with reference to the accompanying drawings. The invention is not limited to the embodiments.

First Embodiment

Figure 1:
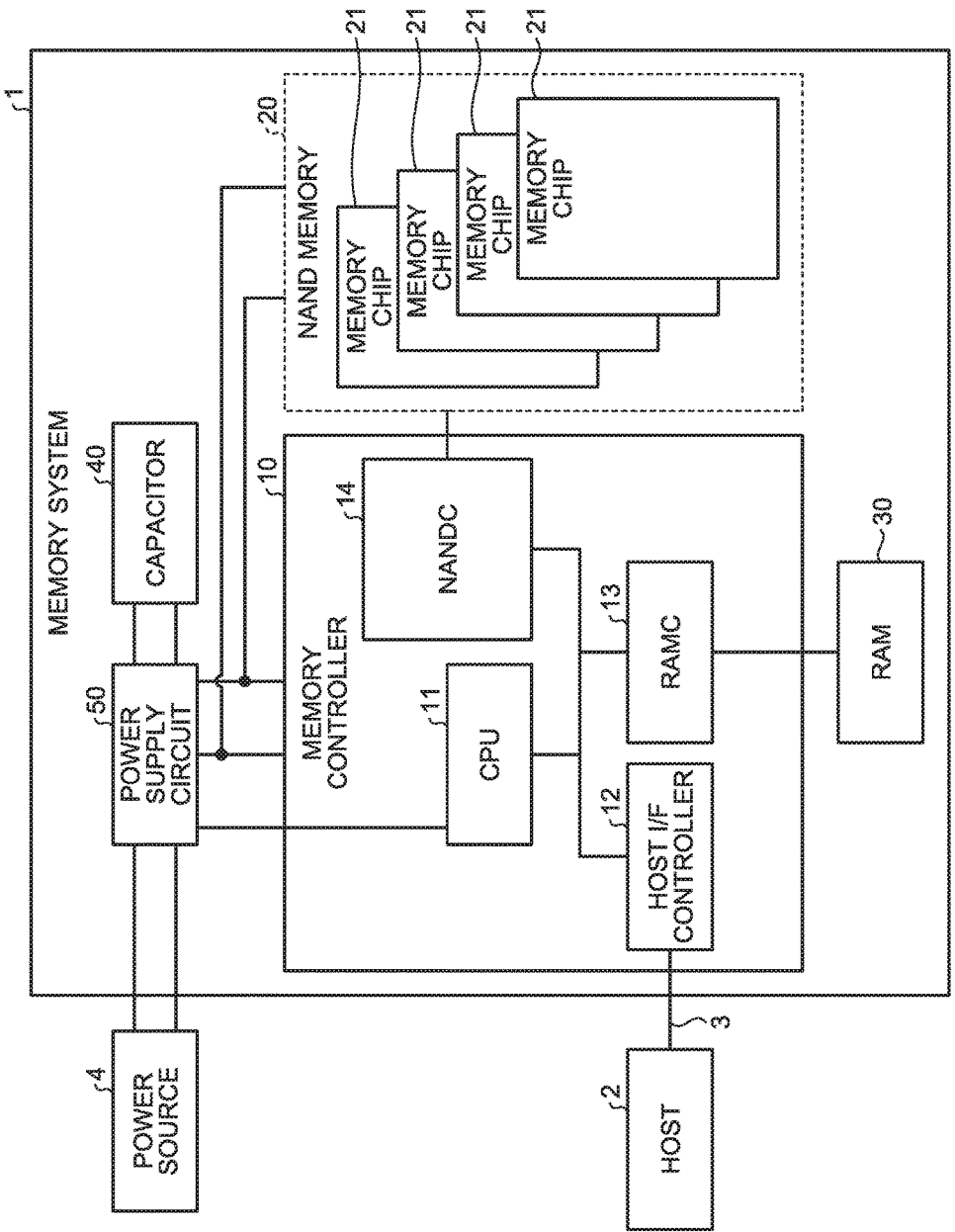
FIG. 1 is a diagram illustrating an example of a configuration of a memory system according to a first embodiment.

FIG. 1 is a diagram illustrating an example of a configuration of a memory system according to a first embodiment. A memory system 1 is connected to a host 2 via a communication line 3. The host 2 is a processor or a peripheral device of a computer. Examples of the computer include a personal computer, a portable computer, a server, and a portable communication device. The memory system 1 functions as an external storage device of the host 2. Any standard can be employed as an interface standard of the communication line 3. The host 2 can issue an access request (such as a writing request and a reading request) to the memory system 1. The access request includes a logical address. The logical address indicates a location in a logical address space which the memory system 1 provides to the host 2. The logical address space is partitioned, for example, into plural clusters, and a head location of each cluster or each cluster itself is designated by a unique logical address. In the access request, plural clusters of which the logical addresses are continuous may be designated by combination of the logical addresses and size information.

The memory system 1 includes a memory controller 10, a NAND type flash memory (NAND memory) 20, a random access memory (RAM) 30, a capacitor 40, and a power supply circuit 50.

The NAND memory 20 is used as a storage memory. The type of a memory which is used as the storage memory is not limited to the NAND type flash memory. For example, a NOR type flash memory, a magneto-resistive memory (MRAM), a phase-change memory (PcRAM), or a resistive random access memory (RRAM (registered trademark)) can be employed as the storage memory. In another example, a flash memory in which memory cell transistors are threedimensionally stacked on a semiconductor substrate can be employed as the storage memory. The storage memory is required to be nonvolatile.

The RAM 30 is a volatile memory and is used as a memory in which information is temporarily stored. The RAM 30 stores, for example, transfer data (user data 201) between the NAND memory 20 and the host 2, information required for quick reference, or information having a high update frequency. The information stored in the RAM 30 will be described later. The RAM 30 may be included in the memory controller 10. Any type of RAM can be employed as the RAM 30. For example, a dynamic random access memory (DRAM) or a static random access memory (SRAM) can be employed.

The power supply circuit 50 supplies power to the memory controller 10, the NAND memory 20, and the RAM 30, by converting or not converting the power supplied from an external power source 4. The power source 4 may be built in the host 2 or may be installed outside the host 2. The memory controller 10 and the NAND memory 20 operate by using the power supplied from the power supply circuit 50. The power supply circuit 50 charges the capacitor 40 with the power supplied from the external power source 4. Any type or battery can be employed as the capacitor 40 as long as it is a battery chargeable with electric charges (electrons or holes).

The memory system 1 receives a notice of power-off from the host 2 before the memory system is powered off. When the notice of power-off is received, the memory controller 10 (more specifically, a processor 110) starts a power-off sequence. When the power supply is turned off without the notice of power-off, the power supply circuit 50 detects stopping of the power supply. For example, the power supply circuit 50 monitors a voltage of the power supplied from the power source 4 and detects stopping of the power supply when the monitored voltage value is less than a certain threshold value. The power supply circuit 50 transmits a notification indicating stopping of the power supply to a central processing unit (CPU) 11. The CPU 11 starts an emergent power-off sequence when the notification indicating stopping of the power supply is received. The capacitor 40 supplies power for realizing the emergent power-off sequence. The power supply circuit 50 switches a power supply source from the power source 4 to the capacitor 40 when the normal power supply stops. The normal power-off sequence and the emergent power-off sequence include a non-volatilization process. The non-volatilization process refers to a process of writing certain information in a volatile memory (here, the RAM 30) to a nonvolatile memory (here, the NAND memory 20). In the non-volatilization process, the certain information in the volatile memory may be copied to the nonvolatile memory without any change or the certain information in the volatile memory may be converted and the converted certain information may be stored in the nonvolatile memory. The normal power-off sequence and the emergent power-off sequence may be different from each other or may be equal to each other.

The capacitor 40 may not be included in the memory system 1. In this case, when the power supply is turned off without any notice, information in the RAM 30 will be lost.

The NAND memory 20 includes one or more memory chips 21. Here, the NAND memory 20 includes four memory chips 21. Each memory chip 21 includes plural blocks. A block is a minimum unit in which data is collectively erased. Each block includes plural pages. A page is a minimum unit in which data is read collectively and is written collectively.

The memory controller 10 includes a CPU 11, a host interface (I/F) controller 12, a random access memory controller (RAMC) 13, and a NAND controller (NANDC) 14. The CPU 11, the host I/F controller 12, the RAM 30, and the NANDC 14 are connected to each other via a bus.

The RAMC 13 controls input and output to and from the RAM 30. The host I/F controller 12 controls the communication line 3. The host I/F controller 12 receives various requests from the host 2. The host I/F controller 12 transfers data between the host 2 and the RAM 30. The NANDC 14 transfers data between the RAM 30 and the NAND memory 20. That is, the user data 201 is transferred between the host 2 and the NAND memory 20 via the RAM 30. The CPU 11 controls the memory controller 10 on the basis of a firmware program.

The firmware program is stored in advance, for example, in the NAND memory 20. The firmware program is loaded into the RAM 30 at the time of booting. The CPU 11 is a circuit that executes various functions on the basis of the firmware program loaded to the RAM 30. A RAM may be disposed in the CPU 11 and the firmware program may be loaded to the RAM in the CPU 11. Various functions which are executed by the CPU 11 will be described later.

Figure 2:
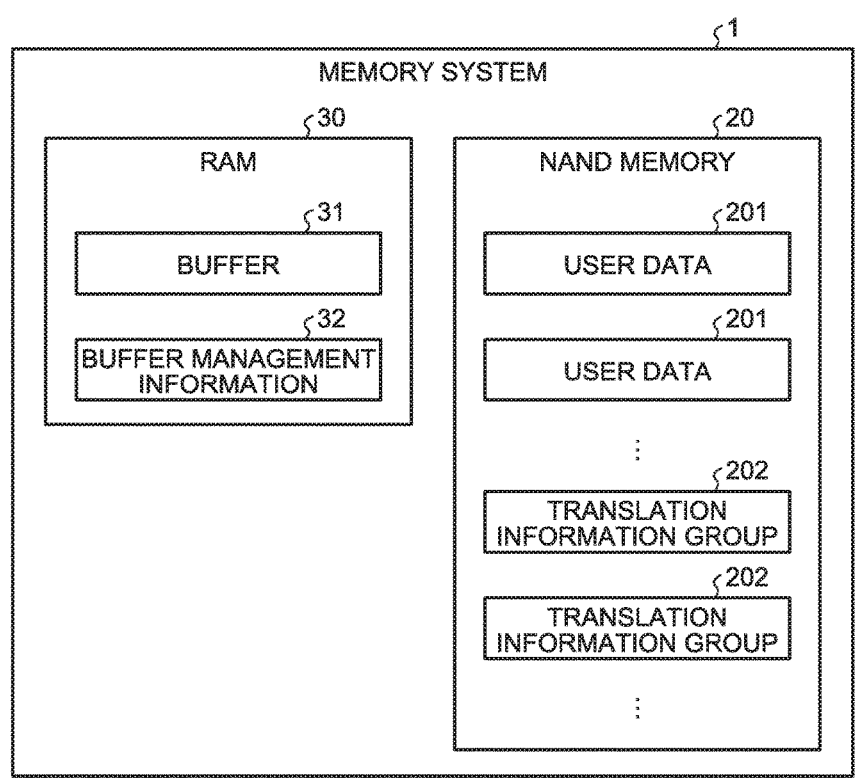
FIG. 2 is a diagram illustrating an example of information which is stored in each memory in the memory system according to the first embodiment.

FIG. 2 is a diagram illustrating an example of information which is stored in memories in the memory system 1 according to the first embodiment. The NAND memory 20 stores one or more translation information groups 202 and one or more pieces of user data 201. Each user data 201 is data received from the host 2. The data received from the host 2 may be subjected to certain conversion (such as encryption, randomization, or encoding) and then stored as the user data 201 in the NAND memory 20. The conversion will not be described in detail herein.

A buffer 31 which is an area in which one or more translation information groups 202 can be cached is allocated in the RAM 30. The allocating timing of the buffer 31 may be freely designed. Buffer management information 32 which is information for managing the translation information groups 202 cached in the buffer 31 is stored in the RAM 30.

Each translation information group 202 is an information group including plural pieces of translation information that correlates physical addresses with logical addresses. One translation information group 202 correlates physical addresses with logical addresses of a fixed number of clusters included in one corresponding region. That is, the translation information group 202 is a bundle of translation information on all clusters included in a region. The region is an area in which logical addresses are continuous and which includes the fixed number of clusters. The boundary of the region is fixed. Each region can be specified by, for example, a region address. The region address is acquired, for example, by dividing the logical address by the number of clusters included in one region.

The translation information group 202 has a data structure of a lookup table. Physical addresses for each cluster are written in the translation information group 202 in the order of logical addresses corresponding to the physical addresses. The data structure of the translation information group 202 is not limited thereto.

The NAND memory 20 may store plural translation information groups 202. Each translation information group 202 is transmitted from the NAND memory 20 to the buffer 31 and is used in the buffer 31. Here, "using" includes "referring to" and "updating." The translation information group 202 which becomes dirty by update in the buffer 31 is non-volatilized by an eviction process.

"Dirty" means a state in which contents of the translation information group 202 in the buffer 31 are different from contents of the translation information groups 202 of the same region in the NAND memory 20. The translation information group 202 in the buffer 31 is written to the NAND memory 20 by the eviction process and the translation information group 202 in the buffer 31 becomes clean "Clean" means a state in which contents of the translation information group 202 in the buffer 31 are equal to contents of the translation information group 202 of the same region in the NAND memory 20.

In the eviction process, the translation information group 202 in the buffer 31 is written to the NAND memory 20 in a log-structured manner. Accordingly, plural translation information groups 202 of the same region can be present in the NAND memory 20. When a translation information group 202 of a certain region is to be used and the translation information group 202 is not cached in the buffer 31, the memory controller 10 transmits, from the NAND memory 20 to the buffer 31, the translation information group 202 which has been last written to the NAND memory 20 among one or more translation information groups 202 of the region.

Any algorithm can be employed as an algorithm for specifying the translation information group 202 which has been last written to the NAND memory 20 among the one or more translation information groups 202 of the same region. For example, the memory controller 10 stores a table in which a storage location of the corresponding translation information group 202 in the NAND memory 20 is described for each of all the regions in the logical address space. The memory controller 10 updates the storage location of the translation information group 202 described in the table to a location of a writing destination in the eviction process of the corresponding translation information group 202. The memory controller 10 can specify the translation information group 202 last written to the NAND memory 20 for each region by referring to the table.

Figure 3:
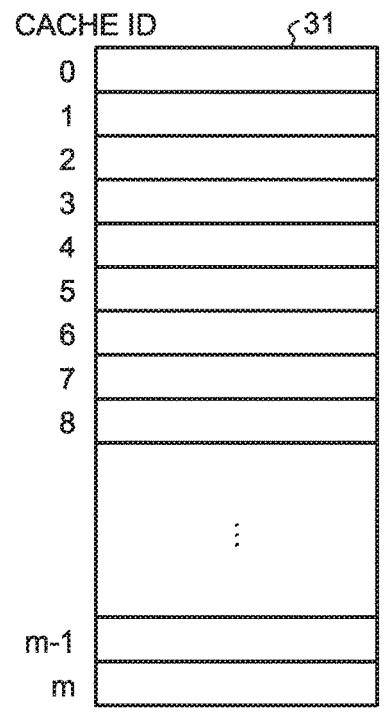
FIG. 3 is a diagram illustrating a structure of a buffer according to the first embodiment.

FIG. 3 is a diagram illustrating a structure of the buffer according to the first embodiment. The buffer 31 includes plural areas having the same size as the size of the translation information group 202. Each area is referred to as a cache line. The location of each cache line can be identified by a cache ID. The location of each cache line may be identified by an address on the RAM 30. Any rule can be employed as a management rule for the buffer 31. For example, first-in first-out (FIFO) or least recently used (LRU) can be employed.

The buffer management information 32 includes at least information of a status for each translation information group 202 cached in the buffer 31. For example, information of a status for each region that constitutes the logical address space is written to the buffer management information 32. The status will be described later.

In another example, the buffer management information 32 includes information indicating whether the translation information group 202 is cached in the buffer 31. The buffer management information 32 includes location information of the cache line in which a translation information group 202 is cached when the translation information group 202 is cached in the buffer 31.

Figure 4:
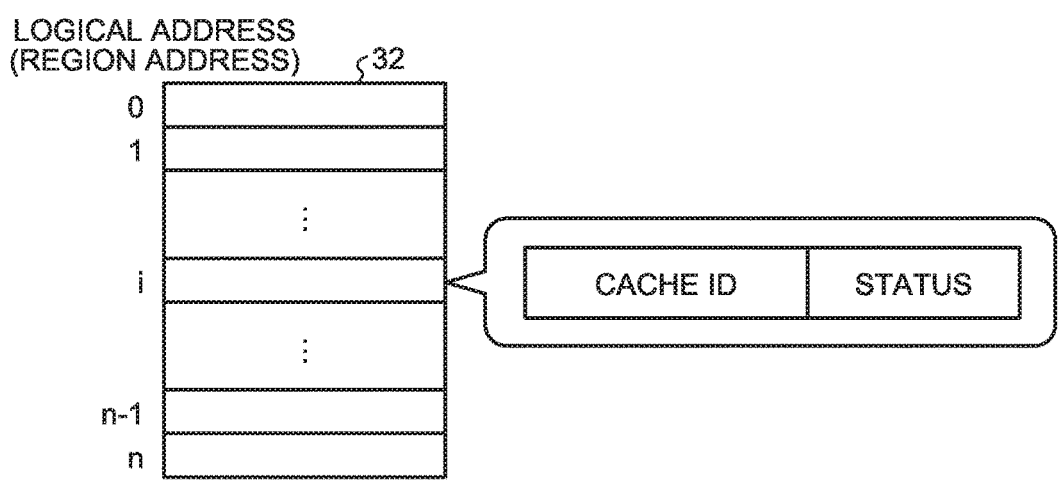
FIG. 4 is a diagram illustrating an example of a data structure of buffer management information according to the first embodiment.

FIG. 4 is a diagram illustrating an example of a data structure of the buffer management information 32 according to the first embodiment. As illustrated in the drawing, the buffer management information 32 has a table structure. Entries of the buffer management information 32 are arranged in the order of region addresses. That is, the buffer management information 32 can be retrieved using a region address as a retrieval key. Each entry includes a field in which location information of a cache line (for example, a cache ID) in which a translation information group 202 is cached and a field in which a status is stored. When the corresponding translation information group 202 is not cached, for example, a value indicating that the corresponding translation information group 202 is not cached is stored in the field of cache ID.

The status indicates at least whether the translation information group 202 stored at the corresponding location is abbreviated or expanded. Details of the abbreviation and the expansion will be described later. Other information may be added as information which can be written as the status. For example, information indicating whether a translation information group 202 is cached or not may be added.

As described above, the translation information group 202 indicates correspondences between the logical addresses and the physical addresses for each of all the clusters included in the corresponding region. In the first embodiment, when a region is mapped on a continuous area in a physical address space, the memory controller 10 abbreviates the translation information group 202 stored in the buffer 31 for the region to information correlating a physical address with a specific logical address in the region. The continuous area is an area in which addresses are continuous. That is, the continuous area in the physical address space is an area in which physical addresses are continuous.

"A region is mapped on a continuous area in a physical address space" means that all the continuous logical addresses included in the region are linearly correlated with plural continuous physical addresses. In other words, "a region is mapped on a continuous area in a physical address space" means that the following conditions (1) and (2) are both satisfied.

(1) The order of physical addresses correlated with the logical addresses of plural clusters included in the region is the same as the order of corresponding logical addresses.

(2) The physical addresses correlated with the logical addresses of plural clusters included in the region are continuous.

In description of the first embodiment, mapping on a continuous area in the physical address space is simply referred to as mapping on a continuous area.

Figure 5:
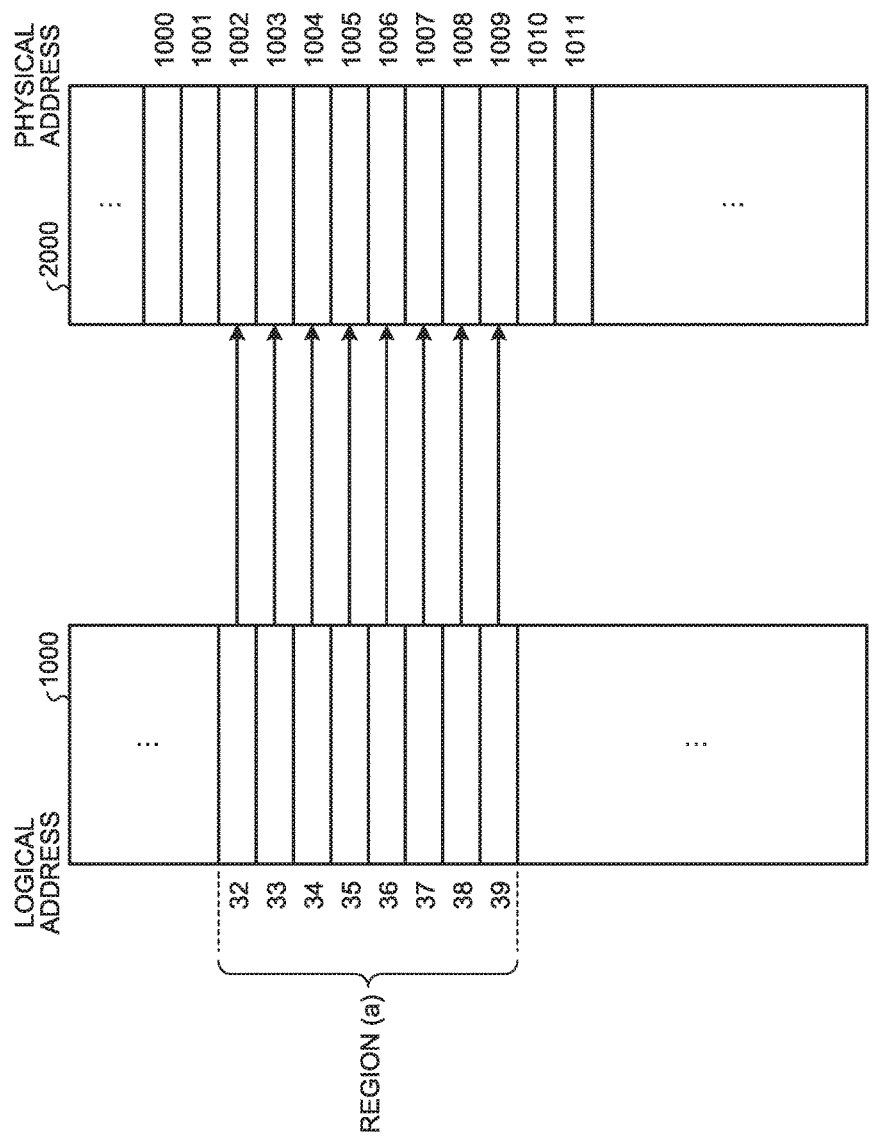
FIG. 5 is a diagram illustrating an example of mapping according to the first embodiment.

FIG. 5 is a diagram illustrating an example of mapping according to the first embodiment. Reference numeral 1000 denotes a logical address space and reference numeral 2000 denotes a physical address space. In the example illustrated in the drawing, each region includes eight clusters. Region (a) is a region in which logical addresses from a logical address "32" to a logical address "39" are continuous. The logical address "32" of the head cluster of Region is correlated with a physical address "1002." A logical address "32+i" of an i-th cluster from the head cluster is correlated with a physical address "1002+i." Here, i is an integer equal to or greater than 0 and equal to or less than 7. In this way, in a region mapped on a continuous area, a physical address corresponding to a logical address (Lhead+i) designating a cluster in the region is acquired by calculating Phead+i. Lhead is a logical address of the head cluster and Phead is a physical address correlated with the logical address Lhead of the head cluster.

In the first embodiment, for example, the logical address of the head cluster of a region corresponds to the above-mentioned specific logical address. That is, the abbreviated translation information group 202 includes only information for translating the logical address of the head cluster of the region into a physical address. The memory controller 10 can abbreviate the translation information group 202 of the region which is a continuous area and store the abbreviated translation information group in the buffer 31.

The memory controller 10 can generate a translation information group 202 including translation information on all the clusters in the region from the abbreviated translation information group 202. "Generating a translation information group 202 including translation information on all the clusters in the region from the abbreviated translation information group 202" is referred to as "expanding". A state in which the translation information group 202 includes the translation information on all the clusters in a region is referred to as an "expanded state".

Figure 6:
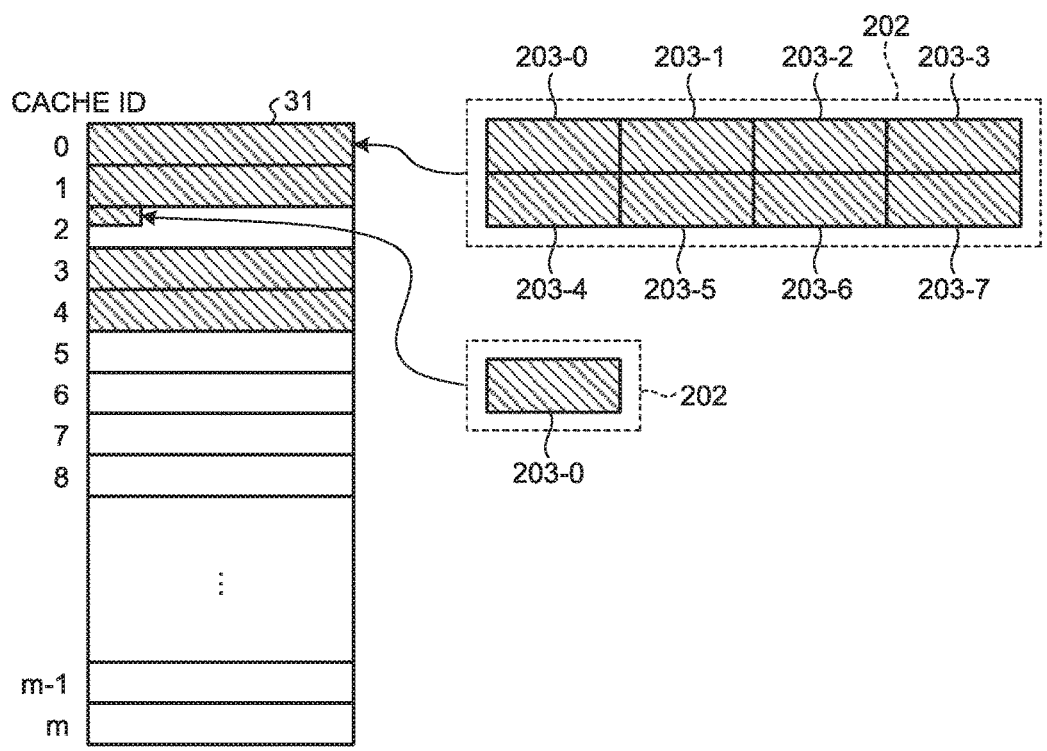
FIG. 6 is a diagram illustrating a buffer according to the first embodiment in a state in which some translation information groups are cached.

FIG. 6 is a diagram illustrating the buffer 31 according to the first embodiment in a state in which some translation information groups 202 are cached. A hatched part indicates a state in which translation information is stored. In the example illustrated in FIG. 6, the translation information groups 202 in the expanded state are cached at the locations indicated by cache IDs "0," "1," "3," and "4," and the translation information group 202 in an abbreviated state is cached at the location indicated by cache ID "2." The translation information group 202 in the expanded state includes translation information 203-0 to translation information 203-7. The translation information 203-0 is translation information correlating a physical address with the logical address of the head cluster of the corresponding region, and the translation information 203-i is translation information correlating a physical address with the logical address of the (i+1)-th cluster from the head cluster. The translation information group 202 in the abbreviated state includes only the translation information 203-0 on the head cluster of the corresponding region. Hereinafter, each translation information is generically referred to as translation information 203.

One translation information group 202 in the abbreviated state may be stored in a vacant area which is generated in the cache line by abbreviation of another translation information group 202. For example, in the example illustrated in FIG. 6, another translation information group 202 in the abbreviated state may be stored in a vacant area of the cache line indicated by the cache ID "2." in this way, since the size of the translation information group 202 is reduced by the abbreviation of the translation information group 202, the translation information 203 can be efficiently cached.

The specific logical address is not limited to the head logical address of a cluster. Any logical address in the cluster can be set as the specific logical address. When a continuous area extends over a boundary of a region, any logical address which is not included in the region can be set as the specific logical address as long as the logical address is included in the continuous area.

Figure 7:
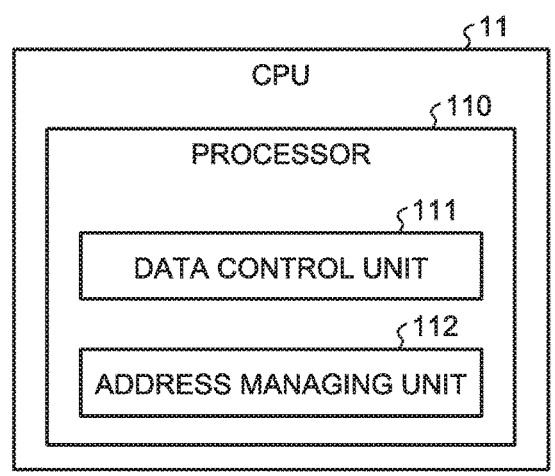
FIG. 7 is a diagram illustrating various functional units according to the first embodiment.

FIG. 7 is a diagram illustrating the various functional units according to the first embodiment which are executed by the CPU 11 by executing firmware. The CPU 11 functions as a processor 110 that controls the memory system 1. The processor 110 includes a data control unit 111 and an address managing unit 112.

A part or all of the functions of the processor 110 may be executed by a hardware circuit. For example, the memory controller 10 may include a field-programmable gate array (FPGA) or an application specific integrated circuit (ASIC) and a part or all of the functions of the processor 110 may be executed by the FPGA or the ASIC.

The address managing unit 112 performs update of and reference to translation information 203. The address managing unit 112 performs control of an input of a translation information group 202 to the buffer 31, an eviction process of the translation information group 202, update of the buffer management information 32 (update cache ID as the location information) based on the input and the eviction process of the translation information group 202 the buffer 31, and the like as a part of update of and reference to the translation information 203.

The address managing unit 112 determines whether a corresponding region is mapped on a continuous area on the basis of the translation information group 202. The address managing unit 112 performs abbreviation of the translation information group 202 on the basis of the determination result. The address managing unit 112 also performs expansion. The address managing unit 112 also performs update of the buffer management information 32 (update of a status) in response to the abbreviation and the expansion of the translation information group 202.

The timing of the abbreviation of the translation information group 202 and the timing of the expansion of the translation information group 202 can be freely designed. In the first embodiment, for example, it is assumed that the abbreviation and the expansion can be performed in the eviction process and the expansion can be performed at the time of updating the translation information 203.

The data control unit 111 accesses the NAND memory 20 by controlling the NANDC 14. The access to the NAND memory 20 particularly includes reading and writing. The data control unit 111 receives a physical address of an access destination from the address managing unit 112.

The access to the NAND memory 20 is not limited to only an access based on an access request from the host 2. The data control unit 111 can perform an access to the NAND memory 20 as a part of internal processing. Examples of the internal processing include garbage collection, wear leveling, and refreshing.

The garbage collection refers to a process of transferring (copying) valid user data 201 from one block to a vacant area of another block and then invalidating the entire data stored in the block as a transfer source by updating the corresponding translation information. That is, in the garbage collection, the data control unit 111 performs reading and writing of the valid user data 201. The block as a transfer source is considered, after the garbage collection, as a free block. After erasing is performed, the free block is changed to a state in which data is not stored at all and data is programmable. After the erasing, the free block can be used as a block of a transfer destination in the garbage collection.

The refreshing is a process of rewriting user data 201 stored in the NAND memory 20. That is, in the refreshing process, the data control unit 111 performs reading and writing of the user data 201. The NAND memory 20 includes a memory cell array including plural memory cell transistors (memory cells). In the writing operation, a threshold voltage of each memory cell is controlled to be within a range corresponding to a data value. The relationship between the threshold voltage range and the data value is determined in advance. However, after the writing, the threshold voltage of each memory cell can be changed with the lapse of time or for each access. When the threshold voltage is changed, the data value programmed in the memory cell may be changed. The changed data value is generally detected, by an error correcting function, as an error. The detected error is corrected, by the error correcting function, to a data value of the time of programming. Correction capability of the error correcting function has an upper limit. In order to prevent the number of errors from being greater than the upper limit of the correction capability, the user data 201 that has been written is refreshed at a certain timing. That is, the refreshing process includes reading and writing of the user data 201. A method of selecting a block of a rewriting destination is not limited to a specific selection method. A block of a reading source may be selected as a block of a rewriting destination after the erasing, or a block other than the block of a reading source may be selected as a block of a rewriting destination.

The wear leveling is a process of equalizing the number of writing times for each block over plural blocks. An example of the wear leveling is a process of transferring at least valid user data 201 between blocks. That as, the wear leveling process includes reading and writing of user data 201.

Figure 8:
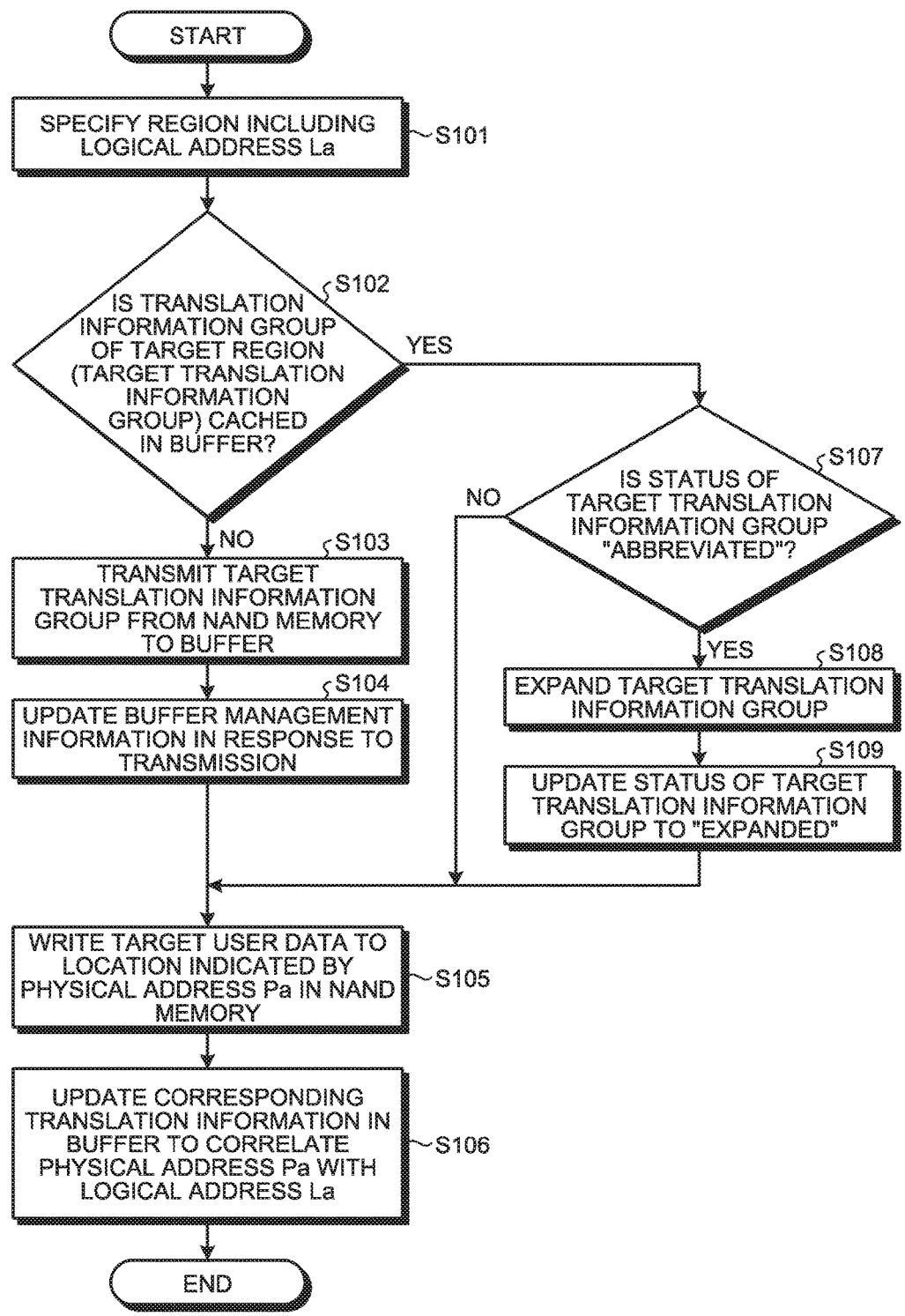
FIG. 8 is a flowchart illustrating a writing operation according to the first embodiment.

Operations of the memory system 1 according to the first embodiment will be described below FIG. 8 is a flowchart illustrating a writing operation in the first embodiment. Here, an example in which a user data 201 which is designated by a logical address La is rewritten to the NAND memory 20 will be described. The user data 201 which is designated by the logical address La is referred to as target user data 201 in description with reference to FIG. 8.

In the case of a writing operation in response to a writing request, the data control unit 111 receives the user data 201 designated by the logical address La from the host 2. The data control unit 111 buffers the received user data 201, for example, in a certain region in the RAM 30. The logical address La is included in the writing request.

In the case of a writing operation due to the internal processing, the user data 201 to be written is read from the NAND memory 20. The reading operation will be described later. The address managing unit 112 specifies the logical address La on the basis of a certain method. For example, the address managing unit 112 manages a table in which logical addresses are correlated with physical addresses and translates a physical address indicating a storage location of the user data 201 to the logical address La on the basis of the table. The method of acquiring a logical address from a physical address is not limited thereto.

First, the address managing unit 112 specifies a region including the logical address La (S101). In description with reference to FIG. 8, the region including the logical address La is referred to as a target region. For example, the address managing unit 112 can acquire a region address indicating the target region by dividing the logical address La by the number of clusters in the region.

Subsequently, the address managing unit 112 determines whether a translation information group 202 of the target region is cached in the buffer 31 with reference to the buffer management information 32 using the region address as a retrieval key (S102). For example, when a value indicating that the corresponding translation information group 202 is not cached is written in the field of cache ID of the retrieved entry, the address managing unit 112 determines that the translation information group 202 of the target region is not cached in the buffer 31. When the cache ID is written in the field, the address managing unit 112 determines that the translation information group 202 of the target region is cached in the buffer 31 and can acquire the location at which the translation information group 202 of the target region is cached in description with reference to FIG. 8, the translation information group 202 of the target region is referred to as a target translation information group 202.

When the target translation information group 202 is not cached in the buffer 31 (S102, No), the address managing unit 112 transmits the target translation information group 202 from the NAND memory 20 to the buffer 31 (S103).

The location at which the target translation information group 202 is input to the buffer 31 is determined on the basis of a management rule of the buffer 31. That is, the method of determining the input location to the buffer 31 is not limited to a specific method. When a translation information group 202 which is dirty is cached at the location to which the target translation information group 202 is determined to be input, the processor 110 performs an eviction process to non-volatize the dirty translation information group 202 in the NAND memory 20 before inputting the target translation information group 202. After the dirty translation information group 202 becomes clean by the eviction process, the target translation information group 202 is input in an overwriting manner.

In response to the process of 3103, the address managing unit 112 updates the buffer management information 32 (S104). For example, the address managing unit 112 writes a cache ID indicating an input location of the target translation information group 202 in the field of cache ID of the corresponding entry in an overwriting manner. When another entry has the same cache ID as the cache ID indicating an input location of the target translation information group 202, the address managing unit 112 writes a value indicating that the corresponding translation information group 202 is not cached in said another entry in an overwriting manner.

Subsequently, the data control unit 111 writes the target user data 201 to a vacant location of the NAND memory 20 (S105). The physical address of the location as a writing destination is determined, for example, by the address managing unit 112 and the data control unit 111 is notified of the physical address. The physical address as the location of the wilting destination is set to Pa.

Subsequently, the address managing unit 112 updates translation information 203 on the logical address La included in the target translation information group 202 in the buffer 31 to correlate the physical address Pa with the logical address La (S106). Then, the writing operation is completed.

On the other hand, when the target translation information group 202 is cached in the buffer 31 (S102, Yes), the address managing unit 112 determines whether the status of the target translation information group 202 is "abbreviated" (S107). The status of the target translation information group 202 is written in the field of a status which is included in the corresponding entry of the buffer management information 32.

When the status of the target translation information group 202 is "abbreviated" (S107, Yes), the address managing unit 112 expands the target translation information group 202 (S108).

For example, when a region includes eight clusters and the target translation information group 202 in the abbreviated state includes translation information 203-0 for correlating the physical address "Pb" with the logical address "Lb," the address managing unit 112 generates translation information 203-1 for correlating a physical address "Pb+1" with a logical address "Lb+1," translation information. 203-2 for correlating a physical address "Pb+2" with a logical address "Lb+2," translation information 203-3 for correlating a physical address "Pb+3" with a logical address "Lb+3," translation information 203-4 for correlating a physical address "Pb+4" with a logical address "Lb+4," translation information 203-5 for correlating a physical address "Pb+5" with a logical address "Lb+5," translation information 203-6 for correlating a physical address "Pb+6" with a logical address "Lb+6," and translation information 203-7 for correlating a physical address "Pb+7" with a logical address "Lb+7." Then, the address managing unit 112 can acquire the translation information group 202 in the expanded state by constructing a lookup table from the translation information 203-0 of the head cluster and the generated pieces of translation information 203-1 to 203-7.

The input location of the translation information group 202 in the expanded state to the buffer 31 can be determined using any method. For example, the address managing unit 112 overwrites the target translation information group 202 in the abbreviated state in the buffer 31 with the target translation information group 202 in the expanded state. In another example, the address managing unit 112 determines the location on the basis of the management rule of the buffer 31. When the target translation information group 202 in the expanded state is input to the location which is determined on the basis of the management rule, the address managing unit 112 updates contents of the field of cache ID corresponding to the target region in the buffer management information 32 depending on the input of the target translation information group 202 in the expanded state.

Subsequently, the address managing unit 112 updates the status of the target translation information group 202 to "expanded" (S109). Then, the process of S105 is performed.

When the status of the target translation information group 202 is not "abbreviated" (S107, No), the processes of S106 and S109 are skipped.

Figure 9:
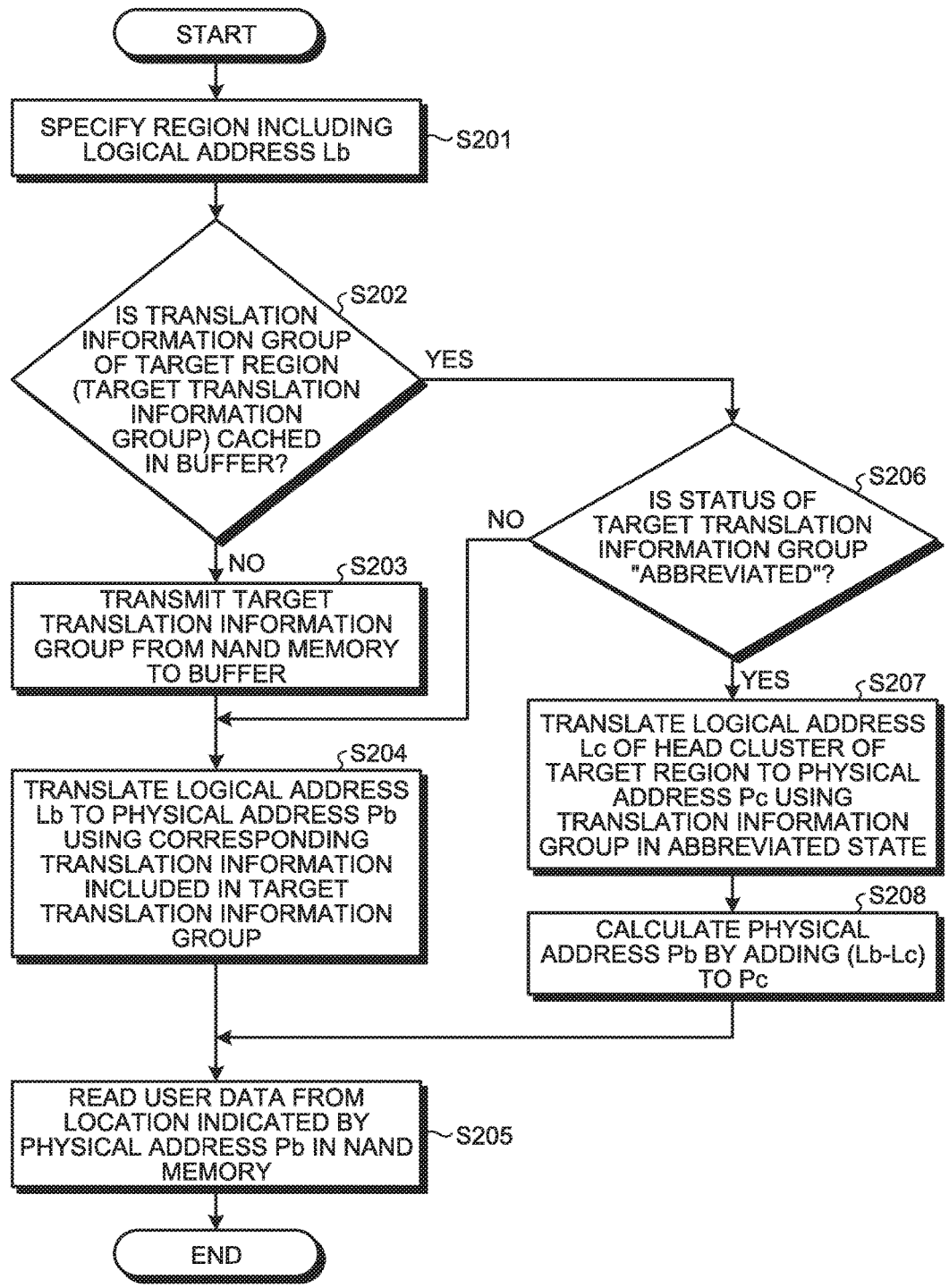
FIG. 9 is a flowchart illustrating a reading operation according to the first embodiment.

FIG. 9 is a flowchart illustrating a reading operation in the first embodiment. Here, an example in which user data 201 which is designated by a logical address Lb is read from the NAND memory 20 will be described. The user data 201 which is designated by the logical address Lb is referred to as target user data 201 in description with reference to FIG. 9. A physical address indicating a location at which the target user data 201 is stored is referred to as Pb. The method of specifying the logical address Lb is the same as in the writing operation.

The processes of S201 to S203 are the same as the processes of S101 to S103. That is, the address managing unit 112 first specifies a region including the logical address Lb (S201). In description with reference to FIG. 9, the region including the logical address Lb is referred to as a target region. A translation information group 202 of the target region is referred to as a target translation information group 202 in description with reference to FIG. 9. The address managing unit 112 determines whether the target translation information group 202 is cached in the buffer 31 with reference to the buffer management information 32 using the region address as a retrieval key (S202).

When the target translation information group 202 is not cached in the buffer 31 (S202, No), the address managing unit 112 transmits the target translation information group 202 from the NAND memory 20 to the buffer 31 (S203).

Subsequently, the address managing unit 112 translates the logical address Lb to the physical address Pb using the target translation information 203 stored in the buffer 31 (S204). The data control unit 111 reads the user data 201 from the location indicated by the physical address Pb (S205). Then, the reading operation is completed. In the case of a reading operation in response to a reading request, the data control unit 111 transmits the read user data 201 to the host 2. In the case of a reading operation included in the internal processing, the read user data 201 is rewritten to the NAND memory 20 by the processes illustrated in FIG. 8.

On the other hand, when the target translation information group 202 is cached in the buffer 31 (S202, Yes), the address managing unit 112 determines whether the status of the target translation information group 202 is "abbreviated" (S206).

When the status of the target translation information group 202 is "abbreviated" (S206, Yes), the address managing unit 112 translates the logical address of the head cluster of the target region to a physical address using the target translation information group 202 in the abbreviated state (S207). Here, it is assumed that the logical address of the head cluster of the target region is Lc and the physical address correlated with the logical address Lc is Pc.

Subsequently, the address managing unit 112 calculates the physical address Pb by adding (Lb-Lc) to the physical address Pc (S208). (Lb-Lc) means an offset of logical address Lb from the logical address Lc of the head cluster of the target region. After the process of S208 is performed, the process of S205 is performed.

When the status of the target translation information group 202 is not "abbreviated" (S206, No), the process of S204 is performed.

Figure 10:
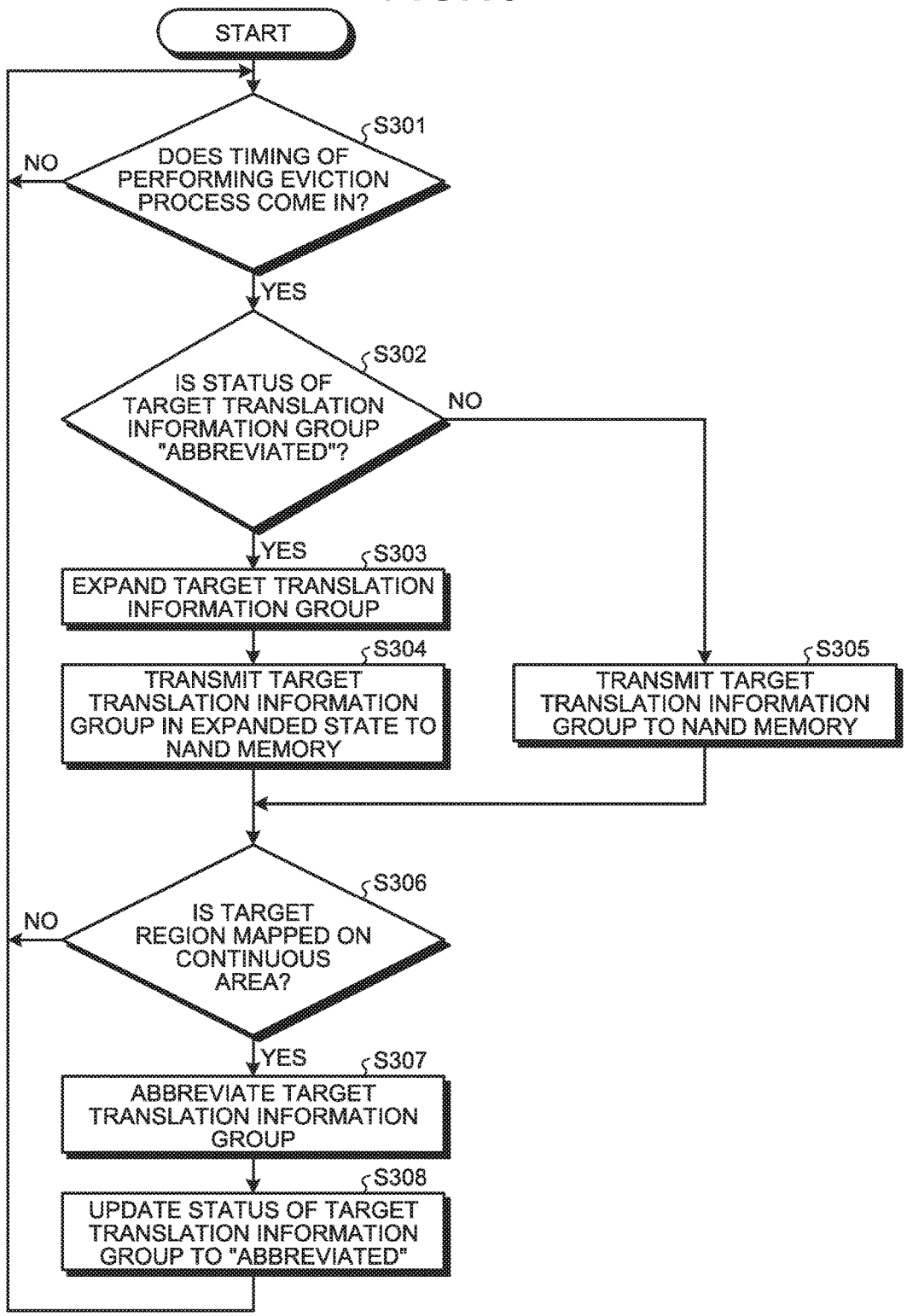
FIG. 10 is a flowchart illustrating an eviction processing operation according to the first embodiment.

FIG. 10 is a flowchart illustrating an operation of the eviction process in the first embodiment. The eviction process is performed, for example, on a dirty translation information group 202. In FIG. 10, a translation information group 202 to be subjected to the eviction process is referred to as a target translation information group 202. A region in which the logical addresses of the clusters are translated using the target translation information group 202 is referred to as a target region.

The method of identifying the target region is not limited to a specific method. For example, the address managing unit 112 manages a table in which a region address is correlated with a location at which the translation information group 202 is cached. The address managing unit 112 can acquire a region address of the target region by searching the table using the location at which the target translation information group 202 is cached as a retrieval key.

First, the address managing unit 112 determines whether timing of performing an eviction process comes in (S301). The timing of performing an eviction process can be freely designed.

For example, the timing of performing an eviction process is determined on the basis of the amount of the dirty translation information group 202 which is cached in the buffer 31. When the amount of the dirty translation information group 202 in the buffer 31 is greater than a threshold value, the address managing unit 112 determines that the timing of performing an eviction process comes in. When the amount of the dirty translation information group 202 in the buffer 31 is not greater than the threshold value, the address managing unit 112 determines that the timing of performing an eviction process does not come in. The threshold value is determined in consideration of an amount of data which can be non-volatilized in the emergent power-off sequence. For example, in a case where the capacity of the capacitor 40 is large, a large amount of data can be non-volatilized in the emergent power-off sequence and thus the threshold value is set to a large value. In a case where the capacity of the capacitor 40 is small, only a small amount of data can be non-volatilized in the NAND memory 20 in the emergent power-off sequence and thus the threshold value is set to a small value.

The threshold value may be set to a small value regardless of the capacity of the capacitor 40. The amount of the dirty translation information group 202 in the buffer 31 can be reduced by setting the threshold value to a small value. Accordingly, even when an accident in which data in the buffer 31 is deleted from the memory system 1 occurs, it is possible to suppress damage. When the capacitor 40 is not included in the memory system 1, it is possible to further suppress damage.

In another example, the address managing unit 112 may determine that the timing of performing an eviction process comes in with a constant cycle. In another example, the address managing unit 112 may determine that timing of performing an eviction process comes in when a process having high priority such as response to the host 2 is not performed or in an idle state. In this way, the timing of performing an eviction process may be freely designed.

When the timing of performing an eviction process comes in (S301, Yes), the address managing unit 112 determines whether the status of the target translation information group 202 is "abbreviated" with reference to the buffer management information 32 using the region address of the target region as a retrieval key (S302).

When the status of the target translation information group 202 is "abbreviated" (S302, Yes), the address managing unit 112 expands the target translation information group 202 (S303).

For example, the address managing unit 112 expands the target translation information group 202 in the buffer 31 and updates the status to "expanded." The address managing unit 112 may input the expanded target translation information group 202 to the location at which the non-expanded translation information group 202 has been cached in an overwriting manner or may input the expanded target translation information group 202 to a new input location. When the target translation information group 202 in the expanded state is input to a new input location, the address managing unit 112 updates contents of the field of cache ID of the corresponding entry in the buffer management information 32 depending on the input location.

In another example, the address managing unit 112 may expand the target translation information group 202 in an area other than the buffer 31 in the RAM 30 and may keep the target translation information group 202 in the buffer 31 in the abbreviated state. In this case, the abbreviation processes (S306 to S308) to be described later can be skipped.

The address managing unit 112 transmits the target translation information group 202 in the expanded state to the NAND memory 20 (S304).

When the status of the target translation information group 202 is not "abbreviated" (S302, No), the address managing unit 112 transmits the target translation information group 202 to the NAND memory 20 (S305).

After the process of S304 or S305, the address managing unit 112 determines whether the target region is mapped on a continuous area (S306). When the target region is mapped on a continuous area (S306, Yes), the address managing unit 112 abbreviates the target translation information group 202 in the buffer 31 (S307).

The location to which the target translation information group 202 in the abbreviated state can be determined using any method. For example, the address managing unit 112 deletes the target translation information group 202 not abbreviated in the buffer 31 and inputs the target translation information group 202 in the abbreviated state to the location at which the target translation information group 202 not abbreviated has been cached.

In another example, the address managing unit 112 determines a new location and inputs the target translation information group 202 in the abbreviated state to the determined location. The address managing unit 112 updates the contents of the field of cache ID in the corresponding entry of the buffer management information 32 with the change of the location at which the target translation information group 202 is cached. As a new location, a new cache line, or a vacant region of the cache line in which another target translation information group 202 in the abbreviated state has been stored, may be determined.

Subsequently, the address managing unit 112 updates the status of the target translation information group 202 to "abbreviated" (S308).

When the timing of performing the evict on process does not come in (S301, No), the control flow moves to S301. When the target region is not mapped on a continuous area (S306, No), the control flow moves to S301. After the process of S308, the control flow moves to S301.

In description with reference to FIG. 10, the address managing unit 112 transmits the target translation information group 202 in the expanded state to the NAND memory 20. The address managing unit 112 may transmit the target translation information group 202 to the NAND memory 20 without expanding the target translation information group. When the target translation information group 202 is in the expanded state, the address managing unit 112 determines whether the target translation information group 202 can be abbreviated, and may abbreviate the target translation information group 202 and then transmit the abbreviated target translation information group 202 to the NAND memory 20 when the target translation information group 202 can be abbreviated.

In this way, according to the first embodiment of the invention, the address managing unit 112 performs reference to the translation information 203, update of the translation information 203, transmission of the translation information 203 between the NAND memory 20 and the buffer 31, and the like in the writing process, the reading process, and the eviction process. That is, the address managing unit 112 manages the translation information 203. When a region is mapped on a continuous area in the physical address space, the address managing unit 112 caches the translation information 203 for correlating the physical address with the head logical address of the region in the buffer 31 and does not cache the translation information 203 for correlating the physical addresses with the other logical addresses in the region in the buffer 31. Accordingly, since the amount of translation information 203 cached in the buffer 31 is reduced, the translation information 203 is efficiently cached.

The address managing unit 112 may be configured to cache translation information 203 for correlating a physical address with a logical address other than the head logical address of the region in the buffer 31. In other words, the address managing unit 112 may treat any logical address other than the head logical address of the region as the specific logical address.

The address managing unit 112 translates the head logical address of the region to the physical address with reference to the translation information 203 for correlating the physical address with the head logical address of the region, and translates the target logical address to the physical address by adding an offset from the head logical address of the region which is the target logical address to the physical address acquired by the translation. In this way, the address managing unit 112 can perform translation without expanding the translation information group 202 in the abbreviated state.

Upon non-volatilizing a translation information group 202 cached in the buffer to the NAND memory 20, the address managing unit 112 determines whether the corresponding region is mapped on a continuous area in the physical address space with reference to the translation information group 202. When the corresponding region is mapped on a continuous area in the physical address space, the address managing unit 112 non-volatilizes the translation information group 202 and then abbreviates the translation information group 202. When the corresponding region is not mapped on a continuous area in the physical address space, the address managing unit 112 non-volatilizes the translation information group 202 and does not abbreviate the translation information 203. In this way, the address managing unit 112 can perform abbreviation in the eviction process. The address managing unit 112 may perform abbreviation at a time not associated with the eviction process.

When the translation information group 202 is abbreviated and when user data 201 which is designated by the logical address in the region associated with the translation information group 202 is written to the NAND memory 20, the address managing unit 112 expands the translation information group 202 in the abbreviated state in the buffer 31 and updates the corresponding translation information 203 included in the translation information group 202 in the expanded state in response to the writing operation. In this way, the address managing unit 112 expands the translation information group 202 in the abbreviated state at the time of wilting. If not necessary, the translation information group 202 is cached in the abbreviated state in the buffer 31 and thus the translation information 203 can be efficiently cached. The address managing unit 112 may perform expansion at a time other than the time of wilting.

Second Embodiment

The method of determining whether a region is mapped on a continuous area in the physical address space can be freely designed. In a second embodiment, an example of the method of determining whether a region is mapped on a continuous area in the physical address space will be described.

The address managing unit 112 according to the second embodiment manages a pair of a tail logical address of a continuous area, which is mapped on a continuous area in the physical address space and which is a continuous area in a logical address space having a head cluster of a region as a head, and a physical address corresponding to the tail logical address, for each translation information group 202 cached in the buffer 31. The pair of the tail logical address and the physical address corresponding to the tail logical address is referred to as boundary information.

For example, a case in which logical addresses of clusters included in a region (a) are mapped on a physical address space as illustrated in FIG. 11 is considered. In the example illustrated in FIG. 11, a logical address "32" of the head cluster of the region (a) is correlated with a physical address "1002." A logical address "33" is correlated with a physical address "1003," a logical address "34" is correlated with a physical address "1004," a logical address "35" is correlated with a physical address "1005," a logical address "36" is correlated with a physical address "1006," a logical address "37" is correlated with a physical address "1007," a logical address "38" is correlated with a physical address "30128," and a logical address "39" is correlated with a physical address "30129." That is, the continuous area from the head logical address "32" to the logical address "37" in the region (a) is mapped on the continuous area from the physical address "1002" to the physical address "1007." The logical address "38" is mapped on a location which is discontinuous to the area from the logical address "37." The address managing unit 112 stores a pair of the logical address "37" and the physical address "1007" as the boundary information in the example illustrated in FIG. 11.

The data structure of the boundary information can be freely designed as long as it can indicate a discontinuous location. For example, in the example illustrated in FIG. 11, the address managing unit 112 may store a pair of the logical address "38" and the physical address "1008" as the boundary information.

The boundary information is written, for example, to the buffer management information 32. FIG. 12 is a diagram illustrating an example of a data structure of buffer management information 32 according to the second embodiment. As illustrated in the drawing, each entry of the buffer management information 32 has a field of boundary information. The address managing unit 112 writes boundary information to the entry of a region in which the corresponding translation information group 202 is cached in the buffer 31. When discontinuously mapped locations are changed by a writing operation, the address managing unit 112 updates the boundary information.

In the process of S306, whether a target region is mapped on a continuous area is determined depending on whether a logical address included in the boundary information matches a tail logical address of the target region. When the logical address included in the boundary information matches the tail logical address of the target region, the address managing unit 112 determines that the target region is mapped on a continuous area. When the logical address included in the boundary information does not match the tail logical address of the target region, the address managing unit 112 determines that the target region is not mapped on a continuous area.

In this way, the address managing unit 112 can determine whether a target region is mapped on a continuous area, for example, by managing discontinuous locations for each region in which the corresponding translation information group 202 is cached in the buffer 31.

In another example, in the process of S306, it may be determined whether a target region is mapped on a continuous area by checking whether the target translation information group 202 satisfies both of Condition (1) and Condition (2).

As described above, whether a region is mapped on a continuous area in a physical address space can be determined using any method.

Third Embodiment

In the first embodiment, translation is performed by two-step retrieval of the buffer management information 32 and the translation information group 202. In other words, the translation function according to the first embodiment is executed by two-step tables. The buffer management information 32 corresponds to a first-step table and the translation information group 202 corresponds to a second-step table. The second-step table is searched using a pointer (the cache ID in the first embodiment) stored in the first-step table.

The abbreviation technique according to the embodiments of the invention can be applied to a system in which search of two-steps or more tables is required for access to the lowest table in which a physical address can be retrieved (that is, a system of which the translation function is executed by three-steps or more tables).

For example, a translation function is executed by n-steps (where n is an integer of 3 or greater) tables. Here, an i-th-step table (where is an integer equal to or greater than 2 and equal to or less than n) is cached in the buffer 31. The i-th-step table can be abbreviated in the buffer 31 by the address managing unit 112. An (i−1)-th-step table includes a field of status and whether the i-th-step table is abbreviated or expanded is written to the field.

The abbreviation technique according to the embodiments of the invention can be applied to a system in which the translation function is executed by only a one-step table. For example, for all the logical addresses in the logical address space, corresponding translation information 203 is loaded to a specific area in the RAM 30. In the RAM 30, the pieces of translation information 203 are arranged in the order of the logical addresses. When a continuous area in the logical address space is mapped on a continuous area in the physical address space, the translation information 203 of some or all logical addresses included in the continuous area in the logical address space can be abbreviated to a single piece of translation information 203. For example, the translation information 203 in the abbreviated state includes information indicating a correspondence between a specific logical address (a logical address of a head cluster in an example) and a physical address correlated with the specific logical address in a continuous area in the logical address space which is mapped on a continuous area in the physical address space and information indicating a range (size) of the continuous area in the logical address space.

In this way, the abbreviation technique according to the embodiments of the invention can be applied to a system in which the translation function is executed by a one-step table and a system in which the translation function is executed by three-steps or more tables.

Fourth Embodiment

According to the first embodiment, when a region is mapped on a continuous area in the physical address space, the address managing unit 112 can abbreviate a corresponding translation information group 202. When some continuous areas in a region are mapped on a continuous area in the physical address space by plural pieces of translation information 203, the address managing unit 112 may be configured to abbreviate the plural pieces of translation information 203 to a single piece of translation information 203. In this case, the translation information 203 in the abbreviated state includes information indicating a correspondence between a specific logical address (a logical address of a head cluster in an example) and a physical address correlated with the specific logical address in a continuous area in the logical address space which is mapped on a continuous area in the physical address space and information indicating a range (size) of the continuous area in the logical address space.

When a continuous area in the logical address space extending over a boundary of a region is mapped on a continuous area in the physical address space by plural pieces of translation information 203, the address managing unit 112 may be configured to abbreviate the plural pieces of translation information 203 to a single piece of translation information 203.

In this way, the abbreviation can be performed by a unit other than a region. That is, when a continuous area in the logical address space is mapped on a continuous area in the physical address space by plural pieces of translation information 203, the address managing unit 112 can abbreviate the corresponding pieces of translation information 203 without depending on whether the continuous area in the logical address space is a region. The abbreviation of the plural pieces of translation information 203 means to cache one piece of translation information 203 of the plural pieces of translation information 203 in the buffer 31 and not to cache the other pieces of translation information 203 of the plural pieces of translation information 203 in the buffer 31. When a continuous area in the logical address space is not mapped on a continuous area in the physical address space by the corresponding pieces of translation information 203, the address managing unit 112 caches the plural pieces of translation information 203 in the buffer 31.

Fifth Embodiment

A location at which writing is not possible may appear due to hardware malfunction of a memory cell or the like.

FIG. 13 is a diagram illustrating an example of mapping according to a fifth embodiment. In the example illustrated in FIG. 13, hardware of a location indicated by a physical address "1006" malfunctions. Among plural logical addresses included in the region (a), a continuous area from the logical address "32" to the logical address "35" is mapped on a continuous area from a physical address "1002" to a physical address "1005," and a continuous area from the logical address "36" to the logical address "39" is mapped on a continuous area from a physical address "1007" to a physical address "1010."

The address managing unit 112 may be configured to determine that a region is mapped on a continuous area when the region is mapped on a continuous area which is partitioned into plural parts, as in the example illustrated in FIG. 13. For example, the address managing unit 112 writes the physical address of the malfunction location in a table or the like. The address managing unit 112 determines whether discontinuity of physical addresses is due to malfunction on the basis of the table. When the discontinuity of physical addresses is due to malfunction, the address managing unit 112 considers the discontinuous part as a continuous part.

The host 2 may notify the memory system 1 of logical addresses which are not used by a trim request.

FIG. 14 is a diagram illustrating another example of mapping according to the fifth embodiment. In the example illustrated in FIG. 14, a region from a logical address "32" to a logical address "39" is mapped on a region of a physical address "1002" to a physical address "1009." A notification indicating that the logical address "35" correlated with the physical address "1005" is not used is transmitted by the trim request. As a result, a region (a) and the area on which the region (a) is mapped are discontinuous at only a location which is unnecessary by the trim request.

The address managing unit 112 may be configured to determine that a region is a continuous area even when the region or an area on which the region is mapped is a continuous area partitioned into plural parts by a location which is designated to be unnecessary by a trim request as in the example illustrated in FIG. 14. For example, the address managing unit 112 stores a pair of a logical address notified by the trim request and a physical address correlated with the logical address in a table or the like. Then, the address managing unit 112 determines whether discontinuity of the addresses is due to the trim request on the basis of the table. When the discontinuity of addresses is due to the trim request, the address managing unit 112 considers discontinuous parts as continuous parts.

In this way, when addresses are discontinuous for a certain specific reason, the address managing unit 112 can be configured to consider the discontinuous parts as continuous parts.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a first memory that is nonvolatile;
a second memory that includes a buffer; and
a memory controller configured to:
manage a logical address space by dividing the logical address space into a plurality of regions, each region including a fixed number of continuous logical addresses, the fixed number being an integer larger than one; and
manage a plurality of pieces of translation information, each piece of translation information correlating a physical address indicating a location in the first memory with a logical address,
wherein
the plurality of pieces of translation information includes a first plurality of pieces of translation information correlating the fixed number of physical addresses with the fixed number of continuous logical addresses included in one region of the plurality of regions,
in a case where the first plurality of pieces of translation information correspond to a second plurality of pieces of translation information, the second plurality of pieces of translation information linearly correlating a plurality of continuous physical addresses with a plurality of continuous logical addresses,
the memory controller caches first translation information correlating a first physical address with a first logical address among the first plurality of pieces of translation information in the buffer and does not cache second translation information correlating a second physical address with a second logical address among the first plurality of pieces of translation information in the buffer, and
in a case where the first plurality of pieces of translation information do not correspond to the second plurality of pieces of translation information,
the memory controller caches the first plurality of pieces of translation information in the buffer.

2. The memory system according to claim 1, wherein, in a case where the first translation information is cached in the buffer and the second translation information is not cached in the buffer, the memory controller
translates the first logical address into the first physical address with reference to the first translation information cached in the buffer, and
translates the second logical address into the second physical address by adding an offset of the second logical address from the first logical address to the first physical address.

3. The memory system according to claim 1, wherein the first logical address is a head logical address among the fixed number of logical addresses included in the one region, and
the second logical address is a logical address other than the head logical address among the fixed number of logical addresses included in the one region.

4. The memory system according to claim 1, wherein the memory controller caches the first plurality of pieces of translation information in the buffer and then determines whether the first plurality of pieces of translation information correspond to the second plurality of pieces of translation information.

5. The memory system according to claim 4, wherein the memory controller
determines whether the first plurality of pieces of translation information correspond to the second plurality of pieces of translation information when the first plurality of pieces of translation information cached in the buffer are non-volatilized to the first memory,
non-volatilizes the first plurality of pieces of translation information to the first memory, caches the first translation information in the buffer, and does not cache the second translation information in the buffer in a case where the first plurality of pieces of translation information correspond to the second plurality of pieces of translation information, and
non-volatilizes the first plurality of pieces of translation information in the first memory and leaves the first plurality of pieces of translation information in the buffer in a case where the first plurality of pieces of translation information do not correspond to the second plurality of pieces of translation information.

6. The memory system according to claim 1, wherein in a case where the first translation information is cached in the buffer and the second translation information is not cached in the buffer and data designated by a third logical address in the one region is written to the first memory, the memory controller generates the first plurality of pieces of translation information in the buffer on the basis of the first translation information and updates translation information on the third logical address in the first plurality of pieces of translation information in the buffer.

7. A method of controlling a memory system including a first memory that is nonvolatile and a second memory that includes a buffer, the method comprising:
managing a logical address space by dividing the logical address space into a plurality of regions, each region including a fixed number of continuous logical addresses, the fixed number being an integer larger than one;
managing a plurality of pieces of translation information, each piece of translation information correlating a physical address indicating a location in the first memory with a logical address, the plurality of pieces of translation information including a first plurality of pieces of translation information correlating the fixed number of physical addresses with the fixed number of continuous logical addresses included in one region of the plurality of regions;
in a case where the first plurality of pieces of translation information correspond to a second plurality of pieces of translation information, the second plurality of pieces of translation information linearly correlating a plurality of continuous physical addresses with a plurality of continuous logical addresses,
caching first translation information correlating a first physical address with a first logical address among the first plurality of pieces of translation information in the buffer and not caching second translation information correlating a second physical address with a second logical address among the first plurality of pieces of translation information in the buffer; and in a case where the first plurality of pieces of translation information do not correspond to the second plurality of pieces of translation information, caching the first plurality of pieces of translation information in the buffer.

8. The method according to claim 7, further comprising:

in a case where the first translation information is cached in the buffer and the second translation information is not cached in the buffer, translating the first logical address into the first physical address with reference to the first translation information cached in the buffer, and translating the second logical address into the second physical address by adding an offset of the second logical address from the first logical address to the first physical address.

9. The method according to claim 7, wherein the first logical address is a head logical address among the fixed number of logical addresses included in the one region, and the second logical address is a logical address other than the head logical address among the fixed number of logical addresses included in the one region.

10. The method according to claim 7, further comprising:

caching the first plurality of pieces of translation information in the buffer and then determining whether the first plurality of pieces of translation information correspond to the second plurality of pieces of translation information.

11. The method according to claim 10, further comprising:

determining whether the first plurality of pieces of translation information correspond to the second plurality of pieces of translation information when the first plurality of pieces of translation information cached in the buffer are non-volatilized to the first memory, non-volatilizing the first plurality of pieces of translation information to the first memory, caching the first translation information in the buffer, and not caching the second translation information in the buffer in a case where the first plurality of pieces of translation information correspond to the second plurality of pieces of translation information, and non-volatilizing the first plurality of pieces of translation information in the first memory and leaving the first plurality of pieces of translation information in the buffer in a case where the first plurality of pieces of translation information do not correspond to the second plurality of pieces of translation information.

12. The method according to claim 7, further comprising:

in a case where the first translation information is cached in the buffer and the second translation information is not cached in the buffer and data designated by a third logical address in the one region is written to the first memory, generating the first plurality of pieces of translation information in the buffer on the basis of the first translation information and updating translation information on the third logical address in the first plurality of pieces of translation information in the buffer.

* * * * *